Feb. 25, 1969   O. F. RUIZ   3,429,282
APPARATUS FOR SEPARATING TORTILLAS AND
THE LIKE FROM FORMING ROLL
Filed Oct. 21, 1966   Sheet 1 of 2

OSCAR F. RUIZ
INVENTOR

Huebner & Worrel
ATTORNEYS

OSCAR F. RUIZ
INVENTOR

Huebner & Worrel
ATTORNEYS

United States Patent Office 3,429,282
Patented Feb. 25, 1969

3,429,282
APPARATUS FOR SEPARATING TORTILLAS AND
THE LIKE FROM FORMING ROLL
Oscar F. Ruiz, P.O. Box 1253,
Tulare, Calif. 93274
Filed Oct. 21, 1966, Ser. No. 588,495
U.S. Cl. 107—12          10 Claims
Int. Cl. A21c 3/00; A46b 15/00; B21b 45/02

ABSTRACT OF THE DISCLOSURE

In dough forming apparatus, a device for stripping formed dough from a concave roll including a wire tensioned in oblique angular disposition to the length of the roll in such relation to the concavity thereof as substantially to conform to the periphery thereof so as to pass between the surface of the roll and dough adhered thereto.

The present invention relates generally to dough forming machines, and more particularly to apparatus for making tortillas and the like which, as is well known, are substantially uniform in thickness, circular and flat, and are formed from either wheat or corn flour.

Traditionally, tortillas have been formed by hand shaping. Such hand shaping to form or shape the dough into thin sheets of conventionally circular tortilla form has potentially unsanitary aspects, and is an unsatisfactory processing technique because of practical and economic problems involved, particularly where the desired production is of commercial volume.

There have been machines and apparatus devised adapted to mechanically and in an automated fashion, form and shape tortillas, but these have been principally confined to tortillas formed from wheat flour of a relatively unsticky consistency.

A very substantial demand exists for tortillas formed of corn flour and, heretofore, the supplying of such demand has not been practically feasible in mechanized or automated apparatus. The commercial formation of conventional corn tortillas consists in cooking a batch of previously dried corn for a substantial period of time, in the nature of two to two and a half hours in one hundred pound batches, setting aside the so-cooked corn to cool off over night, and then subsequently grinding the so-cooked corn into dough. The dough thus formed is then shaped into the generally known tortilla configuration by a hand operation, and as is well known, corn flour so prepared usually has a substantially sticky texture, which has heretofore prevented practical automated machine formation of corn dough tortillas. One of the principal difficulties encountered has been the tendency of such sticky corn dough to adhere to forming rolls, which otherwise have been fairly satisfactory for preparing tortillas from wheat flour dough. This problem has caused difficulties and, in many instances, has required knocking off the formed tortilla from a processing or forming roll by means of a hand tool or instrument. This, in many instances, has resulted in damaging the formed tortilla and has led to such an unsatisfactory automated production of corn dough tortillas that the mechanical production of corn tortillas has been regarded as impractical by tortilla manufacturers.

It is accordingly a principal object of the present invention to provide tortilla forming apparatus peculiarly adapted for the formation of tortillas from corn flour dough, and wherein the principal objections and drawbacks, as aforementioned, have been obviated, and the formation of corn dough tortillas between coacting forming rolls is readily and efficiently permitted.

Heretofore, combinations of convex, concave pairs of rolls has been utilized, in conjunction with tortilla cutting mechanisms, for producing raw tortillas, but this has been primarily restricted to use with wheat flour dough where the problem of the dough sticking to the rolls has not been too severe, and the processing of such dough has been economically sound and feasible. The present invention teaches means for adapting such known apparatus to the formation of tortillas from dough of sticky consistency, such as corn flour dough.

The means for so adapting known mechanism consists primarily in the utilization of an arrangement of wires, so disposed with respect to the concave roll in such roll pairs, and which concave roll is usually the second in the roll sequence, whereby the formed tortilla is positively stripped from the concave roll. As is known in previous mechanisms for the formation of tortillas, the concave roll, which is usually the second or last of the pair, is usually followed by the dough which is adherent thereto and this presents a stripping problem.

Due to the configuration of the concave roll, the use of straight edges, or straight wires for stripping purposes is unsatisfactory since they leave centrally disposed portions of the concave roll without stripping means. The present invention, as will be apparent from the following described embodiment, overcomes this difficulty by the utilization of a wire which is obliquely or helically positioned with respect to the concave roll so as to conform to the configuration of the concave roll effectively and efficiently to strip the rolled and formed tortilla from the concave roll.

The present invention additionally provides a machine which is simple and economical to manufacture, dependable in operation, durable in construction, and which is highly satisfactory for accomplishing its intended purposes.

Additional objects and advantages of the present invention will be more readily apparent from the following detailed description of an embodiment thereof when taken together with the accompanying drawings in which.

Figure 4:
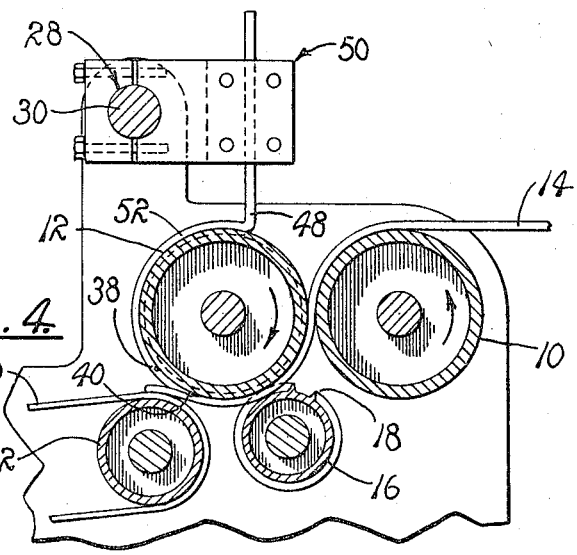
FIG. 4 is a fragmentary section taken on line 4—4 of FIG. 1.
Figure 5:
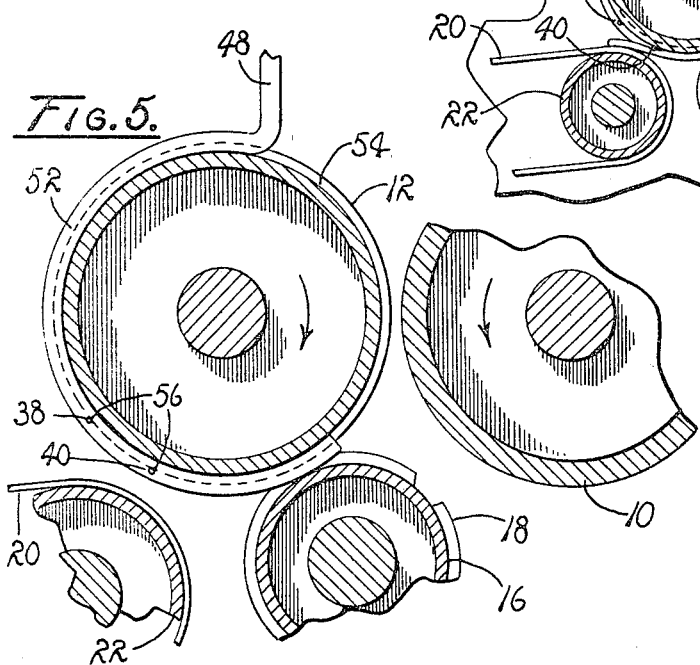
FIG. 5 is an enlarged fragmentary section taken on line 5—5 of FIG. 1 and more clearly disclosing the intercoaction of the various rolls utilized for forming of tortillas in accordance with the present invention.

Referring more specifically to the drawings, there are shown two tortilla forming rolls designated 10 and 12, respectively. The first roll 10 is of convex configuration, as is usual in apparatus of this type, and the second roll 12 is concave in configuration. The rolls are mounted in mated association and during operation are rotated in opposite directions so that their adjacent peripheries travel downwardly together. As shown in FIG. 4, a relatively thick strip of dough 14 passes from previous forming mechanism and thence travels over and partially around roll 10, between the two rolls, and partially under the roll 12. Between the two rolls 10 and 12, the dough strip is flattened and compressed into the desired thickness. A cutting or shaping roll 16 is provided beneath, and in coacting relationship with the roll 12, and has a dough cutting depression or cut out 18 for severing individual tortillas from the previously rolled strip of dough.

Figure 3:
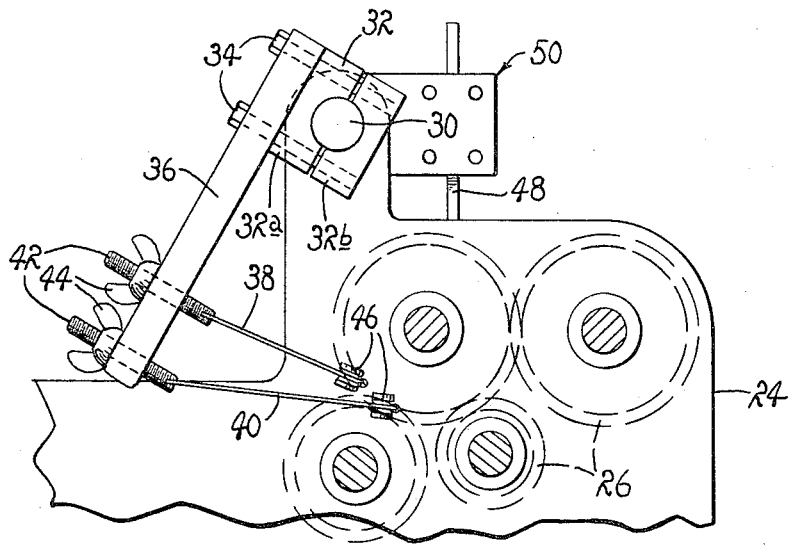
FIG. 3 is a fragmentary section taken on line 3—3 on FIG. 1.

The dough subsequently passes onto a movably mounted endless chain conveyor 20, suitably supported at its ends, such as for example by rollers 22, for subsequent passing to a baking station or the like. This portion of the mechanism is old in the art and does not constitute a portion of the present invention. Drive means generally designated at 24 are provided for the convex, concave combination of rolls, and as a portion of the drive gear train a gear 26 is provided for the rollers 22 for the conveyor. The gear train is diagrammatically shown in FIG. 3 of the drawings, but forming no unique portion of the present invention is not described in detail.

As has previously been indicated, the principal difficulty encountered when utilizing apparatus of this type is the tendency of a wet sticky dough to stick to the concave roll, which the dough tends to follow, and this has heretofore caused insurmountable difficulties in a completely mechanical or automated corn dough tortilla forming apparatus. The use of scraping devices or wires coacting with the rolls has also been known, but, as pointed out, such scrapers have not been practical when utilizing a concave drum or roll configuration. The present invention is primarily directed to the provision of an arrangement of stripping wires which are effective to strip the cut dough from the concave roll, including the cut tortilla flats which have resulted from coaction between the roll 16 and the roll 12. To this end, mounting means generally designated 28, which can consist of a bar or rod 30, is mounted on brackets 32, or the frame portion of the apparatus can be adapted to mount the bar. The brackets 32 can be selectively positioned across the span of the machine and can consist, for example, of bracket halves 32a and 32b interconnected by means of bolts 34 or the like, adapted for securement of the bracket on the rod 30 in an obvious manner.

These brackets 32 additionally support generally downwardly depending arms 36, likewise affixed to the brackets by means of the bolts 34. Wires 38 and 40 are operatively mounted on the arms 36 by means of screws 42 connected to the wire ends, passing through suitable openings in the arms 36 and adjustment means in the nature of wing nuts 44 are provided whereby tensioning of the wires can be effected. Wire directing means 46, which can be in the nature of angular guides having grooved rollers or the like, are suitably supported on the machine frame and serve to position the wires in longitudinally extending positions with respect to the concave rolls. It is to be understood that a plurality of axially aligned concave rolls 12 with their companion axially aligned convex rolls 10 are positioned transversely of the machine. In the present arrangement, such plurality of concave rolls can consist, for example, of eight rolls in end-to-end relation with an aggregate length of about 60 inches, each individual roll which can be of approximately four inches in diameter. The wires traverse the entire length of the concave rolls, and in a continuous zig-zag manner.

Figure 1:
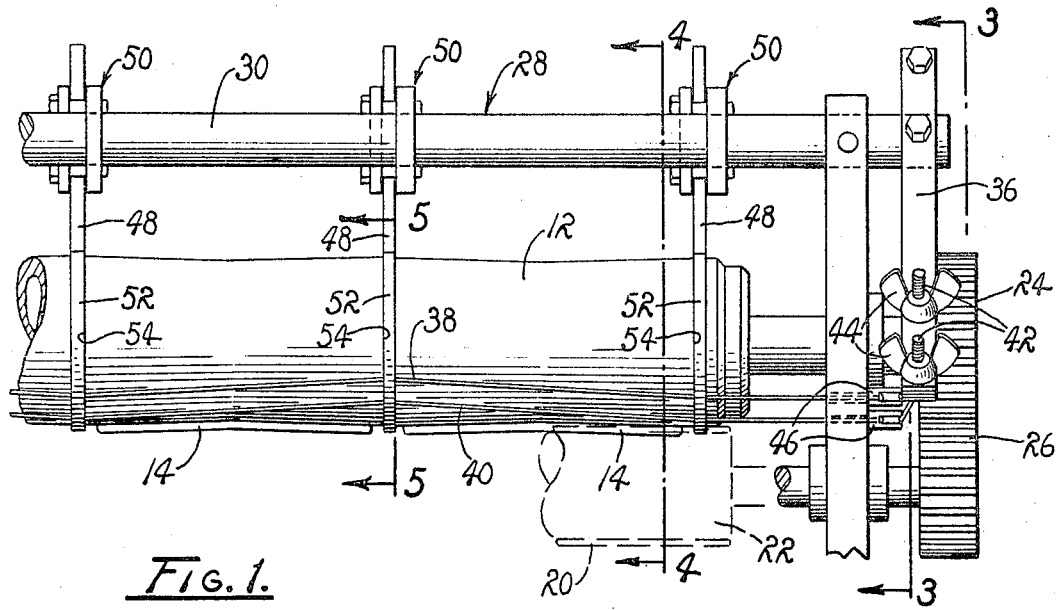
FIG. 1 is a fragmentary plan view of a portion of a machine embodying the present invention.
Figure 2:
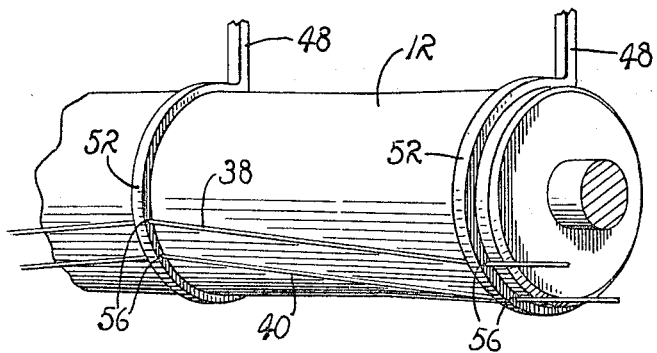
FIG. 2 is a fragmentary perspective of a concave tortilla forming roll with the stripping wires of the present invention applied thereto.

In order to properly position the wires wtih respect to each of the concave rolls 12 of the multiplicity thereof, it is necessary to provide additional support means which can be in the nature of arms 48 operatively mounted by clamping means generally designated 50 and carried on rod 30. The arms 48, at their lower ends, are formed into partially circular portions 52, which generally conform to the circumference of the rolls 12. Grooves 54 are provided in the periphery of the rolls and into which the portions 52 extend. Each of these circularly shaped portions are provided with openings or holes 56 therethrough, through which the wires are threaded as they traverse the machine. As shown in FIGS. 1 and 2, these holes 56 in adjacent ones of the arms 48 are in staggered relationship circumferentially of the rolls so that the wires extending therethrough are arranged in successively oppositely angularly directed helices or helical portions so that the wire positioned across the entire length of the axially aligned concave rolls conforms with the concave shape of each roll, and is in continuous intimate engagement or closely adjacent spaced relation thereto. It has been found preferable to utilize the wires in pairs, as shown in FIGS. 1 and 2 of the drawings, and this has proven to give more effective strippings of the tortilla dough and tortilla flats from the concave rolls.

The concave rolls 12 each preferably consist of two similar, axially aligned, right, frusto-conical portions joined at their smaller ends. Since the wires 38 and 40 are disposed at a smaller angle with respect to the axis of the frusto-conical portions than the elements which generate such portions, the wires will be seen to be disposed in respective planes common to both portions, the intersections of the planes with the portions being substantially hyperbolic.

The essence of the invention, as hereinbefore pointed out, is the provision and mounting of the helically positioned straight wires 38 and 40, with respect to the concave rolls, so that the wires are intimately engaged with, or closely evenly spaced from, the surface of the rolls across its transverse extent. The present arrangement has been found to be extremely effective even when utilizing wet sticky doughs in the nature of corn dough, for example.

Manifestly, minor changes in details of construction and mounting of the wires can be effected but a workable embodiment of the invention has been shown and described hereinabove.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A device for stripping material from a concave roll comprising a substantially straight wire, and means mounting and tensioning the wire adjacent to the roll in oblique angular disposition to the length of the roll in such relation to the concavity thereof as substantially to conform to the periphery thereof so as to pass between the surface of said concave roll and material adherent thereto.

2. The device of claim 1 in which the roll consists of two similar, axially aligned, right, frusto-conical portions joined at their smaller ends.

3. The device of claim 1 in which there are a plurality of straight wires for stripping the material from the roll.

4. In apparatus for flattening and thinning dough, a concave roll adapted for flattening and thinning the dough, a wire having a substantially straight section helically positioned relative to the external surface of the roll so as to be substantially evenly spaced from the surface thereof across the length of said roll and adapted to strip dough from the surface of the roll.

5. In apparatus as claimed in claim 4, there being provided two spaced substantially parallel helically disposed wires.

6. In apparatus as claimed in claim 5, mounting means for said wires including arms having circular portions with openings through which said wires extend for the helical disposition thereof.

7. In apparatus as claimed in claim 6, said roll having peripheral grooves in the surface thereof, said circular portions of said arms extending into said peripheral grooves for placement of said wires in close relationship with the external surface of said roll.

8. In apparatus as claimed in claim 4, and means mounting the ends of said wires for securement and adjustable tensioning thereof.

9. In a dough forming apparatus having a plurality of axially aligned rotatable concave rolls against which dough is shaped and to which the dough tends to adhere; a wire tensioned longitudinally of the rolls, and a wire guide at each end of each roll disposing the wire with respect to the successive rolls in substantially equally opposite oblique angular disposition to the length of the respective rolls, such angular disposition being so related to the extent of concavity of each roll so as to cause the wire to conform to the periphery of the roll throughout its length.

10. The combination of claim 9 in which each roll consists of two similar axially aligned right frusto-conical portions with the smaller ends thereof being juxtaposed and the wire tensioned longitudinally thereof is disposed in a plane common to both portions.

References Cited

UNITED STATES PATENTS

| 2,991,735 | 7/1961 | Womer | 107—12 |
| 3,048,874 | 8/1962 | MacDonald | 15—256.51 |

WALTER A. SCHEEL, *Primary Examiner.*

J. SHEA, *Assistant Examiner.*

U.S. Cl. X.R.

15—256.51